Oct. 4, 1966   F. P. RENNIE   3,277,309
LOW DRAIN PULSE FORMER
Filed March 26, 1962

INVENTOR.
FRANK P. RENNIE
BY *H. H. Hulse*
ATTY.

United States Patent Office 3,277,309
Patented Oct. 4, 1966

3,277,309
LOW DRAIN PULSE FORMER
Frank P. Rennie, Stamford, Conn., assignor to General Time Corporation, New York, N.Y., a corporation of Delaware
Filed Mar. 26, 1962, Ser. No. 182,317
9 Claims. (Cl. 307—88)

The present invention relates to pulse formers and more specifically to a pulse former having novel provision for minimizing the drain upon the connected power supply.

It is an object of the present invention to provide a pulse former which is highly efficient, minimizing the drain upon the associated power supply and which is therefore ideally suited to use in satellites, automatic weather stations or the like, wherever the supply of available electrical energy is severely limited and where operation must take place reliably over long periods of time. It is another object to provide a pulse former which requires only a negligible amount of standby power. The only power required for standby is that which energizes the input trigger, and even this may be avoided in those applications where it is not necessary to use an input trigger.

It is still another object to provide a pulse former capable of producing output pulses of predetermined energy content and wave form regardless of the nature or spacing of the input pulses. Thus, the device is inherently sensitive, capable of responding to poorly defined low power pulses, provided only that the pulses reach a low threshold value. Moreover, the device is capable of responding to input pulses which may vary in magnitude over a wide range, which may vary in wave shape, and which may be received in regular succession or randomly at widely spaced intervals, for example, intervals of up to several months or more, and with no effect upon the accuracy of the pulse output characteristics. At the other extreme, the device is capable of producing accurately formed output pulses even where the input pulses are received at high frequency, frequencies on the order of 30 to 80 k.c.p.s., or even greater, with sine wave input.

It is an object of the invention, related to the foregoing, to provide a pulse former which is capable of responding to pulses of widely varying duration, i.e., pulses which are a few microseconds of duration to pulses which are in the form of a sustained signal of indefinite length. It is another object of the present invention to provide a pulse former employing a saturable magnetic element which insures that current flow will take place as required to produce the condition of full saturation even though the initiating or input signal may be of shorter or longer duration than the saturation period. It is yet another object to provide a pulse former which is positive in operation, with abrupt switching between alternate states and which is largely independent of variations in supply voltage and variations in the operating characteristics and transistors and other circuit components.

Finally it is an object to provide a pulse former which possesses advantages not to be found in conventional devices but which is inherently simple, susceptible to compact or miniaturized circuit techniques, and which may be constructed at low cost as a "building block" for use in more complex apparatus.

Other objects and advantages of the invention will become apparent upon reading the attached detailed description and upon reference to the drawing in which.

Figure 1:
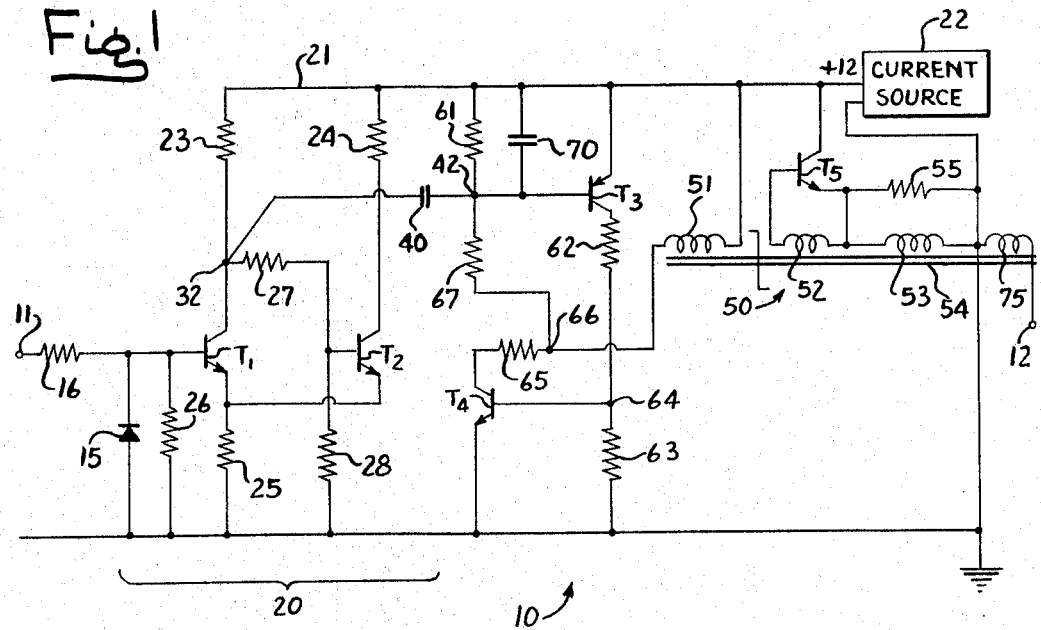
FIGURE 1 is a schematic diagram showing the preferred form of the present invention.

While the invention has been described in connection with a preferred embodiment, it will be understood that I do not intend to be limited to the particular embodiment shown but intend to cover the various alternative and equivalent arrangements included within the spirit and scope of the appended claims.

Turning now to the drawings, the pulse former, indicated generally at 10, has an input terminal 11 and an output terminal 12. The input terminal may be connected to any desired signal source. In the present instance the circuit is intended for response to positive pulses, with a diode 15, having an associated series input resistor 16, being used to shunt negative pulses to ground. For the purpose of converting each positive input pulse to a peaked pulse of reliable amplitude and sharply defined, an input triggering or peaking stage 20 is provided which includes transistors T1, T2 which are, in the present instance, of the NPN variety powered from a current carrying means such as a bus 21 supplied by a current source 22 which, in the case of remote apparatus, will usually be in the form of a battery having limited current capacity. The transistors have collector resistors 23, 24, respectively, and a common emitter resistor 25. The base of the transistor T1 is supplied from the input terminal 11 and has an input or shunting resistor 26. The base of the transistor T2 is supplied from a voltage divider formed of resistors 27, 28 connected to the collector terminal of the transistor T1. The triggering circuit 20 as thus far described will be recognized by one skilled in the art as a Schmidt type of trigger capable of producing a well-defined square output pulse upon receipt of an input pulse and provided only that the input pulse is of sufficient magnitude to initiate current flow in the first transistor.

Figure 3:
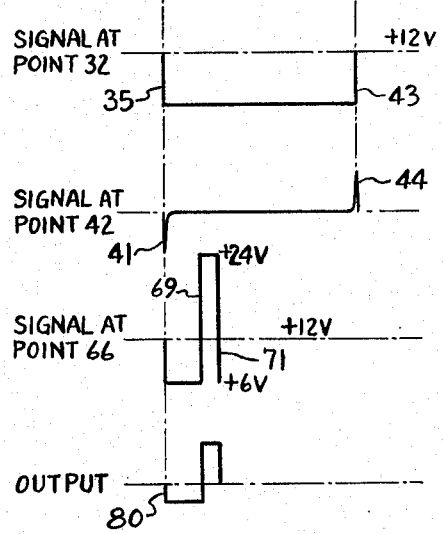
FIG. 3 shows the wave forms at several places in the circuit.

The circuit constants are chosen so that the transistor T2 is biased to saturation, with emitter current flowing through the common emitter resistor 25. When an input pulse, for example the pulse 30 shown in FIG. 3, is received and the input voltage reaches a threshold level 31, current flow is initiated in the first transistor. Because of the circuit connections, initiating current flow in the transistor T1 produces a regenerative switching action so that T1 becomes fully conductive and T2 nonconductive. Thus, when collector current flows in the collector dropping resistor 23, the voltage at the collector terminal swings in the negative direction. This reduces the forward bias on the base of the transistor T2 causing a reduction of current flow therein. With reduced current flowing through the common emitter resistor 25, the voltage drop across such resistor is descreased, thereby increasing the forward bias of the resistor T1. This causes still greater current flow in the transistor T1, still further reducing the forward bias on the transistor T2. The effect being cumulative, the transistor T1 immediately saturates and the transistor T2 becomes nonconductive. The result is a sudden step change of voltage at the point 32 as indicated at 35 from a value of 12 volts to a value substantially less than 12 volts.

In order to derive a sharp negative pulse for application to the succeeding portion of the circuit, a differentiating capacitor 40 is provided, coupled to the point 32 to produce a negative peak 41 (see FIG. 3) which is applied to terminal 42. The peaked pulse 41 suffices to trigger the remainder of the circuit for production of an output pulse from the output terminal 12, as will appear. However, it may be noted at this point that transistor T1 continues to conduct, with transistor T2 remaining non-conductive, as long as an input signal is present at the input terminal 11. Upon cessation of the input signal, the current through the transistor T1 is reduced causing a reduced voltage drop in the collector resistor 23 and a positive going voltage at the collector terminal 32. This produces a positive going voltage at the base of the second transistor T2 which causes conduction to be initiated in the second transistor. The current flow in the common emitter transistor 25 is thus increased, reducing the forward bias on the transistor T1. The effect being cumulative, transistor T1 is restored to its original nonconducting state and transistor T2 becomes saturated, producing a positive going voltage as indicated at 43 which, upon differentiation by the capacitor 40, results in a peaked positive pulse 44 being applied to the terminal 42. However, the peak pulse 44 may be disregarded since it performs no function and its only effect is to drive the succeeding stage further in the direction of cutoff.

Figure 2:
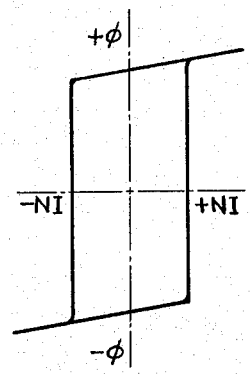
FIG. 2 shows the hysteresis characteristic of the transformer core material.

In carrying out the present invention, a saturable transformer 50 is employed having a saturating winding 51, a triggering winding 52 and a reset winding 53 encircling a saturable core 54. The transformer 50 is preferably of the type disclosed in U.S. Neitzert Patent 2,897,380 which issued July 28, 1959 and to which reference is made. The core 54 has a rectangular saturation characteristic as shown in FIG. 2. It will suffice to say that the transformer has an associated switch in the form of a transistor T5, the input circuit of which is connected to the triggering winding 52 and the output circuit of which serves to energize the reset winding 53 from the current source 22. The transistor T5 is normally nonconducting. When the condition of positive saturation is exceeded in the core 54 by the saturating means to be described, the resulting partial collapse of the flux induces a voltage in the triggering winding 52 in a direction to initiate conduction in the transistor T5. The transistor load current, flowing through the reset winding 53, tends to drive the core in the direction of negative saturation. The resulting induced voltage in the triggering winding 52 sustains the flow of current in the transistor T5 until the core is in a condition of negative saturation, whereupon no further voltage is induced in the triggering winding and conduction in the transistor T5 ceases. Preferably a dissipating resistor 55 is employed in parallel with the reset winding for damping purposes.

In accordance with the present invention, means are provided for initiating the flow of current through the saturating winding 51 of the reactor 50 in response to a short input pulse, a negative peaked pulse in the present instance, and for maintaining the current flow during the time interval required to achieve negative saturation. More specifically, in the practice of the present invention, an input transistor and a saturating transistor are provided connected in cascade for energizing the saturating winding, with a feedback connection from the saturating winding to the input transistor for maintaining current flow in the input transistor during the time interval that a voltage drop exists across the saturating winding. Thus, referring to the drawing, the input transistor, indicated at T3, has an input resistor 61 and collector resistors 62, 63 forming a voltage divider having a terminal 64. The saturating transistor T4 has its base connected to the terminal 64 and its collector connected in series with the saturating winding 51 via a dropping or isolating resistor 65. Feedback from the saturating winding to the input of the input transistor T3 is achieved by a connection 66 including a series resistor 67 connected to the transistor base. This insures that the transistor will remain conductive as long as any voltage drop exists across the saturating winding, i.e., until positive saturation is achieved.

Under normal or standby conditions, there is no current flow in either of the two transistors. However, when a peaked negative pulse 41 is received at the terminal 42, the transistor T3, being of type PNP, is biased for conduction. The resulting current flow through the collector resistors 62, 63 causes the voltage at the tap 64 between them to swing in the positive direction thereby biasing the transistor T4, which is of type NPN, for conduction. The resulting current flow through the saturating winding 51 is in a direction to drive the transformer toward the condition of positive saturation from its standby state of negative saturation. As a result of the buildup of flux in the core, a back E.M.F. is set up in the saturating winding so that the voltage at the terminal thereof, and existing at the connection 66, is sufficient to bias the input transistor T3 for conduction. In a practical case, using a twelve volt source, the induced voltage may be on the order of six volts, causing the base of the transistor T3 to be 0.7 volt negative with respect to the emitter. Thus a continued flow of current in the transistor output circuit is assured even though the initiating negative pulse 41 is no longer effective. The continued flow of current in the transistor T3 biases the saturating transistor T4 for continued flow of saturating current. However, after saturation in the core 50 has been achieved, and just slightly exceeded, the rate of buildup of the flux is drastically reduced, reducing the impedance of the saturating winding 51 to its ohmic resistance and with proportionate reduction in the voltage drop. Thus, there is no longer sufficient forward bias at the input of transistor T3 for conduction. Cessation of conduction in the transistor T3 causes the voltage at terminal 64 in its collector circuit to swing toward ground, thereby cutting off forward bias in the saturating transistor T4 so that no further current flow takes place through the saturating winding 51.

As described in the above mentioned Neitzert patent, the cessation of saturating current causes a slight collapse of the flux back to the level of saturation, inducing a triggering voltage in the triggering winding 52 thereby initiating current flow in the reset transistor T5. The resulting current flowing through the reset winding 53, and which serves to drive the core back to an initial state of negative saturation, causes the voltage at point 66 to be abruptly changed to a relatively high positive value along the line 69.

In accordance with one of the detailed aspects of the invention a holding capacitor is provided in shunt with the input to the transistor T3 for insuring that the transistor T3 remains positively turned off until receipt of the next regular input signal. Specifically a capacitor 70 is provided for storing the positive charge which results upon switching from the condition of positive saturation to the condition of negative saturation in the transformer core. Consequently when the condition of negative saturation is achieved, and slightly exceeded, the spike of voltage 71 (see FIG. 3) induced in the saturating winding 51 upon collapse of flux back to the saturating level, and which is in a direction to produce conduction in the input transistor T3, is made ineffective. Since there is not sufficient total charge in the current spike 71 to reverse the voltage across the holding capacitor 70 from positive to negative within the time constant of the capacitor circuit, there is no risk that the current spike which results from exceeding negative saturation will initiate conduction in the transistor T3 to start the positive saturation cycle all over again. Thus, there is no risk in the present circuit that the reactor and associated circuitry will become "free running."

Output voltage may be taken from the circuit in several ways. Preferably an auxiliary winding 75 may be wound about the core 54. Or, if desired, the voltage swing of the emitter terminal of the reset transistor T5 may be utilized by connecting the emitter directly to the output terminal 12. In any event the output pulse produced by the pulse former is substantially fixed, under all conditions, as to wave shape, duration, and energy content. While the full wave of output current produced by the disclosed circuit is indicated at 80 in FIG. 3, it will be understood that a rectifier in the form of a diode may be included in the output circuit polarized to select either the upper portion or the lower portion of the pulse for use in associated equipment.

Comparing the circuit to that of conventional pulse formers, the reason for the saving in average power becomes apparent. Under stand-by conditions the only transistor drawing current is transistor T2 in the trigger circuit 20, the other transistors are positively cut off. Since transistor T2 is not relied upon to furnish more than a triggering voltage pulse, the transistor chosen for the application may be one having extremely low saturation current. When an input pulse is received at the input terminal 11, transistor T2 turns off and transistor T1 turns on as already described. Such switching takes place within a very few microseconds, thus it will be apparent that the transistors T3, T4 draw current from the source 22 for a period of time which may be only a small fraction of the input pulse applied to the input terminal 11. By contrast, in conventional types of pulse formers employing saturable elements the transistor which supplies saturating current is normally turned on for the full duration of the pulse.

At an input frequency of 5,000 cycles per second the average power consumption using the present circuit is typically as follows: Power consumed by trigger circuit 20, 0.03 watt, power consumed by saturating winding 51 and series resistor 65, 0.06 watt, power consumed by reset winding 53, 0.06 watt. Since the transistors T3, T4 and T5 operate either nonconducting or saturated, the amount of power consumed by the transistors may be considered negligible. Consequently the total average power is on the order of only 0.15 watt, about one-seventh of that of the conventional pulse former. At still lower input frequencies the saving in power is proportionately greater. Thus where the circuit is actuated by, say, a 60 cycle A.-C. wave the present circuit consumes approximately 1/30 of the average power required by a conventional pulse former. Where the input signal to the pulse former is already in the form of a sharply peaked wave, the trigger circuit 20 may, if desired, be dispensed with and the input signal may be applied directly to the point 42, i.e., to the base of the transistor T3, with a series input resistor being provided, if desired, in order to reduce loading effect upon the signal source. This eliminates the necessity for any stand-by current whatsoever since all of the transistors then in the circuit, transistors T3, T4 and T5, are normally nonconducting under stand-by conditions. Either with or without the trigger circuit 20 the device is extremely well suited for use in satellites and similar vehicles for receiving pulses at long and irregular intervals, in which case the average power requirement is negligible. Reliable operation is also achieved even where the input pulse, at terminal 11, is shorter than the time interval required to achieve saturation, i.e., when the input pulse is shorter than, say, 16 microseconds. Thus the device is inherently capable of reliable operation at high frequencies, frequencies on the order of 30 kc. to 80 kc. per second for use in high speed counters and the like.

While the device, as shown, is capable of responding to the leading edge of an input pulse, which may be important where it is desired to minimize phase displacement of the signal, it will be apparent to one skilled in the art that the circuit is not limited to such usage. Instead of connecting the input side of the differentiating capacitor 40 to the collector of the transistor T1, the capacitor may be connected to the collector of the capacitor T2, in which case the negative triggering signal at the base of the input transistor T3 will be produced to coincide with the trailing edge rather than the leading edge of the input pulse. Moreover, it will be apparent to one skilled in the art that where it is desired to have the circuit respond to a positive input pulse, this can be accomplished simply by changing the type of transistor and the polarity of the supply 22.

The operation of the device is positive and precise, with each portion of the circuit simply switching from one state to the opposite state during a typical sequence. Thus the device is largely independent of variations or drift in the supply voltage or variations in the characteristics of the transistors and other circuit components. Since there is no need to employ expensive low tolerance components, or especially matched components, it will be apparent that the above device may be made at low cost using production line techniques. Moreover, since none of the components is subjected to appreciable loading, the amount of heat developed is negligible and all of the components may be compactly potted together to form a unitary building block for use in more complex circuitry.

In a typical pulse former constructed in accordance with the present invention the circuit constants may be as follows:

| Component: | Value |
|---|---|
| 16, 61 | ohms 2200 |
| 23, 24, 28 | do 4700 |
| 25, 63 | do 470 |
| 26 | do 10,000 |
| 27 | do 1000 |
| 40, 70 | microfarad 0.001 |
| 55 | ohms 270 |
| 62 | do 1500 |
| 65 | do 68 |
| 67 | do 3900 |

*Resume of operation*

While the operation of the device will be apparent from the foregoing description, it may be summarized briefly as follows: Referring to the input trigger 20, the transistor T1 is normally biased for nonconduction in the same transistor T2 for conduction with current flowing through the common emitter resistor 25. Upon application of the positive input pulse to the base of the transistor T1 conduction is initiated which, as stated, serves to increase the forward bias of the transistor T1 and reduce the forward bias of the transistor T2. The effect is substantially instantaneous, even more rapid than that characterizing the usual flip-flop circuit, so that a sharp wave front is applied to the differentiating capacitor 40 which produces a peaked pulse at the base of the transistor T3. The resulting flow of collector current turns on the transistor T4 which begins to furnish current to the winding 51 of the transformer 50 to saturate the same. With the transformer core initially in a condition of negative saturation, the buildup of flux in the positive direction produces a voltage drop across the saturating winding which is applied, via the connection 66, to the base of the transistor T3 to maintain conduction even after passage of the initiating pulse from the capacitor 40. When positive saturation is achieved, the voltage drop across the saturating winding becomes that due to ohmic resistance alone which is no longer sufficient to maintain conduction in the transistor T3 so that the transistors T3, T4 become nonconductive. The collapse of the flux to the level of positive saturation induces a voltage in the triggering winding 52 to turn on the reset transistor T5 so that resetting current flows through the reset winding 53 driving the core back in the direction of negative saturation. The induced voltage in the saturating winding 51 during this portion of the cycle is such as to bias the transistor T3 beyond cutoff. The reverse voltage is stored in the capacitor 70 in the transistor input circuit so that the collapse of the excess negative flux, upon non-conduction in the transistor T5, is ineffective to trigger the transistor T3 for conduction and the device remains stably in the off condition until a further input signal is received. The output signal resulting from the driving of the core from negative saturation to positive saturation and then back to negative saturation has a predetermined wave form and energy content regardless of the characteristics of the input pulse which initiated it.

In the following claims reference has been made to the saturable transformer having saturating, triggering and reset windings. It will be understood by one skilled in the art that such windings need not be separate or isolated from one another but one winding may serve more than a single function depending upon the specific circuit connections without departing from the spirit and scope of the claims.

I claim as my invention:

1. In a pulse former capable of producing a well defined output pulse of predetermined energy content upon triggering by a pulse of random duration, wave shape, and energy content but having a voltage exceeding a predetermined threshold the combination comprising an input terminal and an output terminal, a saturable transformer having saturating and reset windings thereon, a transistor stage having an input and an output, a peaking circuit including a two-stage Schmidt trigger interposed between the input terminal and the transistor stage for applying a well defined, sharply peaked pulse of predetermined magnitude to the input of the transistor stage upon receiving a pulse of random duration, wave shape, and energy content but having a voltage exceeding a predetermined threshold, the output of the transistor stage being connected to the saturating winding so that upon receipt of a peaked pulse by the transistor stage flow of current is initiated in the saturating winding in a direction to drive the transformer toward positive saturation, feedback means coupling the saturating winding to the input of the transistor stage so that flow of current is maintained in the saturating winding until positive saturation has been achieved, means responsive to the achieving of positive saturation for producing current flow in the reset winding for reestablishing the transformer in a condition of negative saturation, and means for coupling the output terminal to the transformer to produce an output pulse having predetermined energy content incident to switching of the transformer from one condition of saturation to the other.

2. In a pulse forming circuit the combination comprising a saturable transformer including a saturable core having saturating, triggering and reset windings, means for carrying current, switch means having an input and output with the input of the switch being coupled to the triggering winding and the output of the switch being connected to the reset winding so that when a condition of positive saturation is exceeded the switch is turned on to drive the core to a condition of negative saturation, a saturating transistor having an input circuit and an output circuit with the output circuit being connected in series with the saturating winding and said means for carrying current, an input transistor having an input circuit and an output circuit coupled to the input of the saturating transistor so that upon a momentary input signal to the input transistor the saturating transistor causes current to begin to flow through the saturating winding, and means for connecting the saturating winding to the input of the input transistor and responsive to the voltage drop across the saturating winding for causing conduction to persist in the input transistor and saturating transistor until positive saturation is achieved.

3. In a pulse forming device capable of producing a well defined output pulse of predetermined energy content upon triggering by a random pulse of low energy content, the combination comprising a saturable transformer having saturating, triggering and reset windings as well as a saturable core characterized by a rectangular hysteresis loop, means for carrying current, means having an input terminal and arranged to produce a voltage spike upon receipt of an input pulse, an input transistor and a saturating transistor connected in cascade therewith with the output of the saturating transistor being connected to feed the saturating winding to initiate flow of current thereto from said means for carrying current upon receipt of a voltage spike means responsive to the voltage drop across the saturating winding and coupled to the input of the input transistor for producing a sustained input at the input transistor which persists beyond the voltage spike and until such time as positive saturation occurs in said saturable core, and means responsive to the voltage induced in the triggering winding for causing current to flow in the reset winding to reset the core to the condition of negative saturation in readiness for receipt of a subsequent pulse at the input terminal.

4. In a pulse forming circuit the combination comprising a saturable transformer including a saturable core having saturating, triggering and reset windings, means for carrying current, switch means having an input and output with the input being connected to the triggering winding and the output being connected to the means for carrying current and reset winding so that when a condition of positive saturation is exceeded the switch is triggered for conduction of current flow through said reset winding to drive the core to a condition of negative saturation, an input trigger circuit having an input terminal and an output terminal and so arranged that upon receipt of a voltage pulse a square wave of voltage is produced at the output terminal, differentiating means for differentiating the square wave of voltage to produce a voltage spike, an input transistor and a saturating transistor connected in cascade and with the output of the saturating transistor being connected to the saturating winding of the saturable transformer so that when the voltage spike is received by the input transistor conduction is initiated in the input transistor and saturating transistor tending to drive the core to positive saturation, means for connecting the saturating winding and the input of said input transistor so that the voltage drop across the saturating winding prior to achieving positive saturation causes persistence of an input signal to the input transistor following passage of the voltage spike and until such time as the flux in the core slightly exceeds positive saturation whereupon conduction ceases in said input and saturating transistors and whereupon the switch means is momentarily turned on to restore the core from the condition of positive to the condition of negative saturation in readiness for the receipt of an ensuing voltage pulse at the input trigger circuit.

5. In a pulse former the combination comprising a saturable transformer having a saturable core and saturating, triggering and reset windings thereon, a reset transistor having its input connected to the triggering winding and its output connected to the reset winding so that when the condition of positive saturation is exceeded the reset transistor is triggered for conduction with the resulting current flow through the reset winding serving to drive the core to the condition of negative saturation, a saturating transistor and an input transistor connected to drive said saturating transistor, said transistors being normally biased for non-conduction, said saturating transistor having an output circuit connected in series with the saturating winding so that application of an input pulse to the input transistor serves to initiate current flow in said transistors and through said saturating winding to cause buildup of flux in the core in the direction of positive saturation accompanied by a voltage drop across the saturating winding, and means for coupling the saturating winding to the input of said saturating transistor so that the latter remains turned on notwithstanding the disappearance of the initiating current pulse and until such time as the drop across the saturating winding falls to a low value upon saturation of the core.

6. A pulse former comprising, in combination, an input terminal, a saturable transformer having saturating, triggering and reset windings thereon, means for carrying current, means including a switch responsive to the exceeding of the condition of positive saturation for producing current flow from said means for carrying current to said reset winding for reestablishing a condition of negative saturation, an output terminal coupled to the transformer for producing an output signal upon switching from one condition of saturation to the other, an input trigger circuit connected to the input terminal, a saturating transistor having an output circuit connected in series with said saturating winding, and an input transistor connected between said input trigger circuit and said saturating transistor for driving the latter in response to a pulse from the former, so that upon receipt of an input pulse to said pulse former current flow is initiated in the saturating transistor tending to drive the saturable transformer in the direction of positive saturation, and means for connecting the saturating winding to the input circuit of the transistor stage and responsive to a voltage induced in said winding while the core is substantially unsaturated to maintain said transistor in conduction so as to cause current flow to persist in the transistor stage following cessation of the pulse from the input triggering stage and for a time duration corresponding to the time it takes the saturable transformer to achieve the condition of positive saturation.

7. In a pulse forming device the combination comprising an input terminal and an output terminal, means for carrying current, a saturable transformer having saturating, triggering and reset windings thereon, an input trigger circuit connected to the input terminal, said input trigger circuit being so constructed and arranged as to produce an extremely narrow and sharply defined pulse upon passage of the edge of an iput pulse at the input terminal, a saturating transistor and an input transistor connected to drive said saturating transistor, said transistors being normally biased for non-conduction, said input transistor having its input circuit coupled to said input trigger circuit, said saturating transistor having its output circuit connected to the means for carrying current and to the saturating winding so that upon receipt of the sharply defined pulse from the input trigger circuit flow of current is initiated in said transistors so that current flows through the saturating winding in a direction to produce positive saturation, a feedback means for coupling at least one of the windings of the saturable transformer to the input circuit of said input transistor so that once current flow is initiated in the saturating winding an auxiliary signal is produced at the input circuit of the input transistor in response to a voltage induced in said one of the windings while said core is substantially unsaturated to maintain said transistors in conduction until such time as positive saturation is achieved and so that current flow in said transistors is terminated following saturation even though an input pulse may persist thereafter at the input terminal, and means including a switch responsive to the exceeding of positive saturation in the saturable transformer for producing current flow in the reset winding for the purpose of restoring the saturable transformer to the condition of negative saturation.

8. In a pulse former the combination comprising an input terminal and an output terminal, a saturable transformer having a core and saturating and reset windings thereon, an input transistor and a saturating transistor connected in cascade, a peaking circuit interposed between the input terminal and the input transistor for applying to the latter a peaked pulse upon receipt of a pulse at the input terminal, the output of the saturating transistor being connected to the saturating winding so that upon receipt of a peaked pulse by the input transistor, flow of current is initiated in the saturating winding, feedback means coupling the saturating winding to the input of the input transistor so that flow of current is maintained in the saturating winding until positive saturation has been achieved, means responsive to the achieving of positive saturation for producing current flow in the reset winding for reestablishing the core to a condition of negative saturation and a storage capacitor in the input circuit of the input transistor to insure against conduction in said transistor as a result of voltage induced in said saturating winding when the condition of negative saturation is momentarily exceeded, said output terminal being coupled to the saturable transformer for production of an output pulse upon change from one condition of saturation to the other.

9. In a pulse former, the combination comprising, an input terminal and an output terminal, a saturable transformer having saturating and reset windings thereon, a transistor stage having an input and an output, a peaking circuit including a two-stage Schmidt trigger interposed between the input terminal and the transistor stage for producing a sharply peaked pulse of predetermined shape and amplitude in response to a pulse of random duration and wave form but having a voltage exceeding a predetermined threshold, the output of the transistor stage being connected to the saturating winding so that upon receipt by the peaking circuit of any pulse exceeding said threshold regardless of wave form, flow of current is initiated in the saturating winding in a direction to drive the transformer toward positive saturation, feedback means coupling the saturating winding to the input of the transistor stage so that flow of current is maintained in the saturating winding until positive saturation has been achieved, means responsive to the achieving of positive saturation for producing current flow in the reset winding for reestablishing the transformer to a condition of negative saturation, and means for coupling the output terminal to the transformer to produce an output pulse having predetermined energy content instant to switching of the transformer from one condition of saturation to the other.

References Cited by the Examiner

UNITED STATES PATENTS

| | | | |
|---|---|---|---|
| 2,760,088 | 8/1956 | Pittman | 307—88.5 |
| 3,010,028 | 11/1961 | Meyerhoff | 307—88 |
| 3,201,593 | 8/1965 | Anderson | 307—88 |

BERNARD KONICK, *Primary Examiner.*

IRVING SRAGOW, *Examiner.*

M. S. GITTES, R. J. McCLOSKEY, *Assistant Examiners.*